US009038394B2

(12) United States Patent
Flanagan et al.

(10) Patent No.: US 9,038,394 B2
(45) Date of Patent: May 26, 2015

(54) CONVOLUTION SEAL FOR TRANSITION DUCT IN TURBINE SYSTEM

(75) Inventors: James Scott Flanagan, Simpsonville, SC (US); Jeffrey Scott LeBegue, Simpsonville, SC (US); Kevin Weston McMahan, Greer, SC (US); Daniel Jackson Dillard, Greenville, SC (US); Ronnie Ray Pentecost, Travelers Rest, SC (US)

(73) Assignee: General Electric Company, Schenectady, NY (US)

( * ) Notice: Subject to any disclaimer, the term of this patent is extended or adjusted under 35 U.S.C. 154(b) by 465 days.

(21) Appl. No.: 13/459,533

(22) Filed: Apr. 30, 2012

(65) Prior Publication Data

US 2013/0283818 A1 Oct. 31, 2013

(51) Int. Cl.

| | |
|---|---|
| ***F02C 1/00*** | (2006.01) |
| ***F02C 3/04*** | (2006.01) |
| ***F01D 9/02*** | (2006.01) |
| ***F23R 3/00*** | (2006.01) |
| *F01D 11/00* | (2006.01) |

(52) U.S. Cl.

CPC ................ *F01D 9/023* (2013.01); *F23R 3/002* (2013.01); *F05D 2250/183* (2013.01); *F01D 11/005* (2013.01); *F05D 2240/55* (2013.01); *F05D 2300/501* (2013.01); *F05D 2300/10* (2013.01)

(58) Field of Classification Search

CPC ................................. F23R 3/002; F01D 9/023
USPC .................................... 60/752–760, 805, 806
See application file for complete search history.

(56) References Cited

U.S. PATENT DOCUMENTS

| | | | |
|---|---|---|---|
| 4,422,288 | A | 12/1983 | Steber |
| 4,465,284 | A | 8/1984 | Szema |
| 5,077,967 | A | 1/1992 | Widener et al. |
| 5,118,120 | A | 6/1992 | Drerup et al. |
| 5,149,250 | A | 9/1992 | Plemmons et al. |
| 5,240,263 | A | 8/1993 | Nicholson |
| 5,249,920 | A | 10/1993 | Shepherd et al. |
| 5,414,999 | A | 5/1995 | Barnes |
| 5,457,954 | A | 10/1995 | Boyd et al. |
| 5,592,820 | A | 1/1997 | Alary et al. |
| 5,761,898 | A | 6/1998 | Barnes et al. |

(Continued)

FOREIGN PATENT DOCUMENTS

| | | |
|---|---|---|
| EP | 1903184 A2 | 3/2008 |
| GB | 2190154 | 11/1987 |

OTHER PUBLICATIONS

Search Report and Written Opinion from EP Application No. 13156920.4 dated Aug. 21, 2013.

(Continued)

*Primary Examiner* — Gerald L Sung
(74) *Attorney, Agent, or Firm* — Dority & Manning, P.A.

(57) ABSTRACT

A turbine system is disclosed. In one embodiment, the turbine system includes a transition duct. The transition duct includes an inlet, an outlet, and a passage extending between the inlet and the outlet and defining a longitudinal axis, a radial axis, and a tangential axis. The outlet of the transition duct is offset from the inlet along the longitudinal axis and the tangential axis. The transition duct further includes an interface feature for interfacing with an adjacent transition duct. The turbine system further includes a convolution seal contacting the interface feature to provide a seal between the interface feature and the adjacent transition duct.

17 Claims, 10 Drawing Sheets

(56) References Cited

U.S. PATENT DOCUMENTS

| | | | |
|---|---|---|---|
| 5,839,283 A | 11/1998 | Dübbeling | |
| 5,934,687 A | 8/1999 | Bagepalli et al. | |
| 6,076,835 A | 6/2000 | Ress et al. | |
| 6,202,420 B1 | 3/2001 | Zarzalis et al. | |
| 6,203,025 B1 | 3/2001 | Hayton | |
| 6,431,555 B1 | 8/2002 | Schroder et al. | |
| 6,431,825 B1 | 8/2002 | McLean | |
| 6,442,946 B1 | 9/2002 | Kraft et al. | |
| 6,450,762 B1 | 9/2002 | Munshi | |
| 6,471,475 B1 | 10/2002 | Sasu et al. | |
| 6,537,023 B1 | 3/2003 | Aksit et al. | |
| 6,564,555 B2 | 5/2003 | Rice et al. | |
| 6,652,229 B2 | 11/2003 | Lu | |
| 6,662,567 B1 | 12/2003 | Jorgensen | |
| 7,007,480 B2 | 3/2006 | Nguyen et al. | |
| 7,024,863 B2 | 4/2006 | Morenko | |
| 7,090,224 B2 | 8/2006 | Iguchi et al. | |
| 7,181,914 B2 | 2/2007 | Pidcock et al. | |
| 7,584,620 B2 | 9/2009 | Weaver et al. | |
| 7,637,110 B2 | 12/2009 | Czachor et al. | |
| 7,721,547 B2 | 5/2010 | Bancalari et al. | |
| 7,784,264 B2 | 8/2010 | Weaver et al. | |
| 7,976,074 B2 | 7/2011 | Anderson et al. | |
| 8,065,881 B2 * | 11/2011 | Charron et al. | 60/752 |
| 8,322,146 B2 | 12/2012 | Rizkalla et al. | |
| 8,511,972 B2 | 8/2013 | Sutcu | |
| 8,661,828 B2 | 3/2014 | Pieussergues et al. | |
| 2003/0154719 A1 | 8/2003 | Nishi et al. | |
| 2004/0031271 A1 | 2/2004 | Jorgensen | |
| 2007/0017225 A1 * | 1/2007 | Bancalari et al. | 60/752 |
| 2010/0037617 A1 | 2/2010 | Charron et al. | |
| 2010/0037618 A1 | 2/2010 | Charron et al. | |
| 2010/0037619 A1 | 2/2010 | Charron | |
| 2010/0054928 A1 * | 3/2010 | Schiavo | 415/182.1 |
| 2010/0115953 A1 | 5/2010 | Davis, Jr. et al. | |
| 2010/0180605 A1 | 7/2010 | Charron | |
| 2010/0181734 A1 | 7/2010 | Halling | |
| 2010/0307166 A1 | 12/2010 | Woodcock et al. | |
| 2011/0014029 A1 * | 1/2011 | Venkataraman et al. | 415/110 |
| 2011/0020118 A1 | 1/2011 | Smoke et al. | |
| 2011/0259015 A1 | 10/2011 | Johns et al. | |
| 2012/0200046 A1 | 8/2012 | Green et al. | |
| 2012/0304653 A1 | 12/2012 | Flanagan et al. | |
| 2012/0304665 A1 | 12/2012 | LeBegue et al. | |
| 2013/0111912 A1 | 5/2013 | Flanagan et al. | |
| 2013/0115048 A1 * | 5/2013 | Flanagan et al. | 415/110 |

OTHER PUBLICATIONS

Search Report and Written Opinion from EP Application No. 12182875.0 dated Apr. 17, 2013.

* cited by examiner

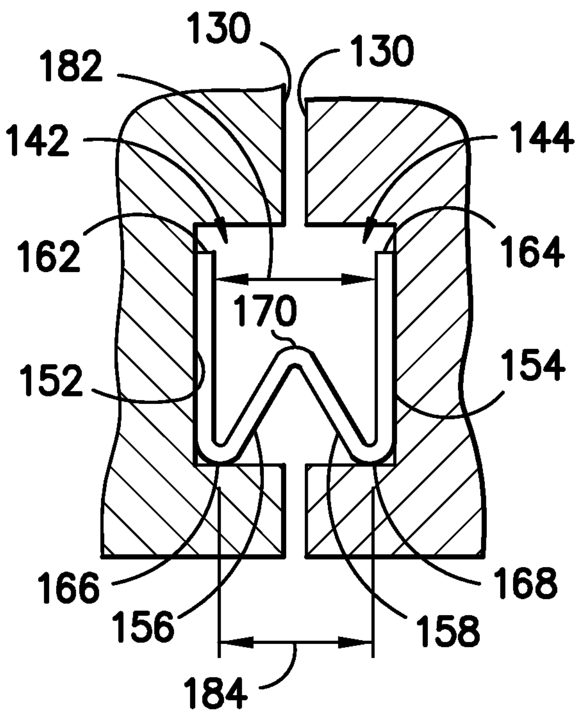
*FIG. –10–*
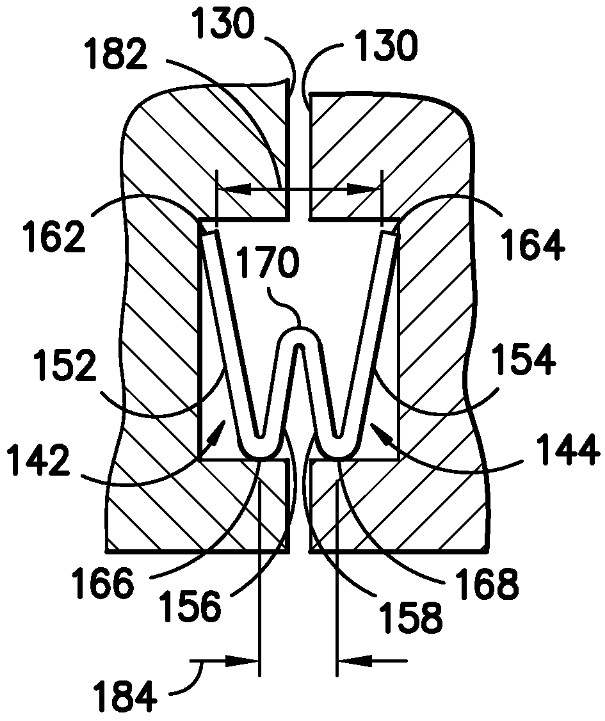
*FIG. –11–*

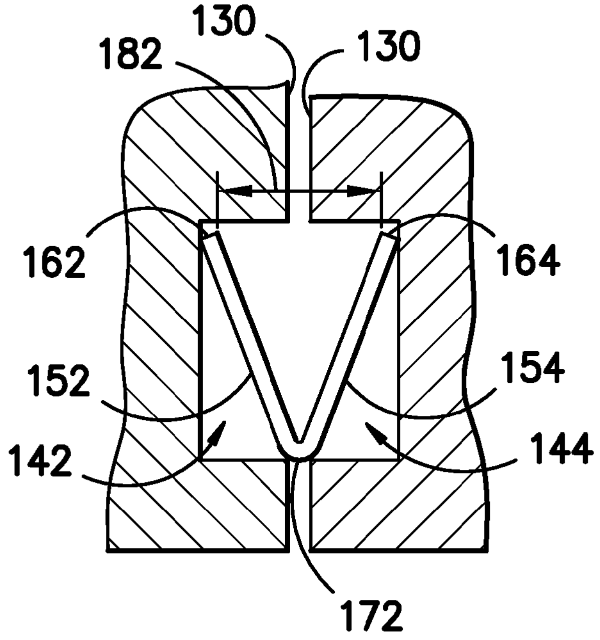
FIG. –12–
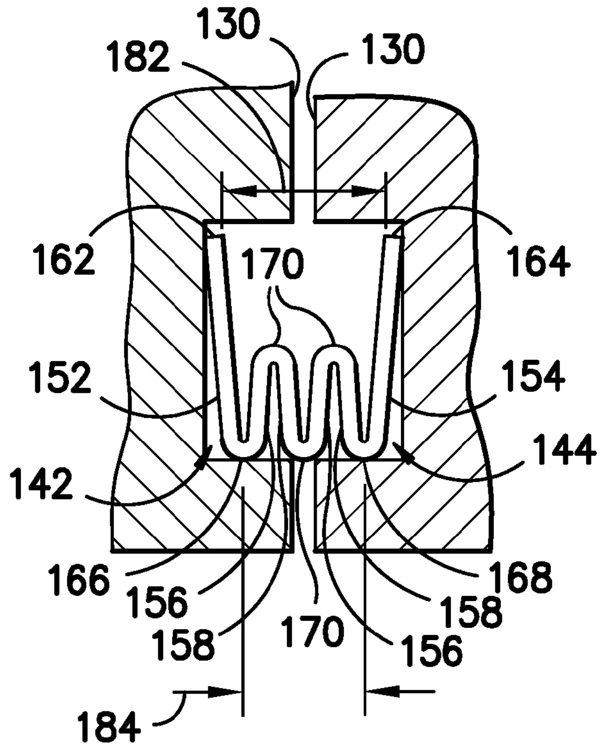
FIG. –13–

CONVOLUTION SEAL FOR TRANSITION DUCT IN TURBINE SYSTEM

This invention was made with government support under contract number DE-FC26-05NT42643 awarded by the Department of Energy. The government has certain rights in the invention.

FIELD OF THE INVENTION

The subject matter disclosed herein relates generally to turbine systems, and more particularly to seals between adjacent transition ducts of turbine systems.

BACKGROUND OF THE INVENTION

Turbine systems are widely utilized in fields such as power generation. For example, a conventional gas turbine system includes a compressor section, a combustor section, and at least one turbine section. The compressor section is configured to compress air as the air flows through the compressor section. The air is then flowed from the compressor section to the combustor section, where it is mixed with fuel and combusted, generating a hot gas flow. The hot gas flow is provided to the turbine section, which utilizes the hot gas flow by extracting energy from it to power the compressor, an electrical generator, and other various loads.

The combustor sections of turbine systems generally include tubes or ducts for flowing the combusted hot gas therethrough to the turbine section or sections. Recently, combustor sections have been introduced which include tubes or ducts that shift the flow of the hot gas. For example, ducts for combustor sections have been introduced that, while flowing the hot gas longitudinally therethrough, additionally shift the flow radially or tangentially such that the flow has various angular components. These designs have various advantages, including eliminating first stage nozzles from the turbine sections. The first stage nozzles were previously provided to shift the hot gas flow, and may not be required due to the design of these ducts. The elimination of first stage nozzles may eliminate associated pressure drops and increase the efficiency and power output of the turbine system.

However, the connection of these ducts to each other is of increased concern. For example, because the ducts do not simply extend along a longitudinal axis, but are rather shifted off-axis from the inlet of the duct to the outlet of the duct, thermal expansion of the ducts can cause undesirable shifts in the ducts along or about various axes. Such shifts can cause unexpected gaps between the adjacent ducts, thus undesirably allowing leakage and mixing of cooling air and hot gas.

This problem is of particular concern due to the interaction between the adjacent ducts. For example, in many embodiments an airfoil trailing edge is formed by adjacent ducts. This airfoil may shift the hot gas flow in the ducts, and thus eliminate the need for first stage nozzles. However, because the airfoil is formed by the adjacent ducts, any gaps between the ducts can allow leakage and mixing which can interfere with the performance of the airfoil.

Accordingly, an improved seal between adjacent combustor ducts in a turbine system would be desired in the art. For example, a seal that allows for thermal growth of the adjacent ducts while preventing gaps between the adjacent ducts would be advantageous.

BRIEF DESCRIPTION OF THE INVENTION

Aspects and advantages of the invention will be set forth in part in the following description, or may be obvious from the description, or may be learned through practice of the invention.

In one embodiment, a turbine system is disclosed. The turbine system includes a transition duct. The transition duct includes an inlet, an outlet, and a passage extending between the inlet and the outlet and defining a longitudinal axis, a radial axis, and a tangential axis. The outlet of the transition duct is offset from the inlet along the longitudinal axis and the tangential axis. The transition duct further includes an interface feature for interfacing with an adjacent transition duct. The turbine system further includes a convolution seal contacting the interface feature to provide a seal between the interface feature and the adjacent transition duct.

In another embodiment, a turbine system is disclosed. The turbine system include a plurality of transition ducts disposed in a generally annular array. Each of the plurality of transition ducts includes an inlet, an outlet, and a passage extending between the inlet and the outlet and defining a longitudinal axis, a radial axis, and a tangential axis. The outlet of the transition duct is offset from the inlet along the longitudinal axis and the tangential axis. Each of the plurality of transition ducts further includes a first interface feature and a second interface feature. The turbine system further includes a plurality of convolution seals. Each of the plurality of convolution seals contacts and provides a seal between a first interface feature of one of the plurality of transition ducts and a second interface feature of an adjacent one of the plurality of transition ducts.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 10 is a cross-sectional view of an interface between a transition duct and an adjacent transition duct according to another embodiment of the present disclosure;

FIG. 11 is a cross-sectional view of an interface between a transition duct and an adjacent transition duct according to another embodiment of the present disclosure;

FIG. 12 is a cross-sectional view of an interface between a transition duct and an adjacent transition duct according to another embodiment of the present disclosure;

FIG. 13 is a cross-sectional view of an interface between a transition duct and an adjacent transition duct according to another embodiment of the present disclosure.

DETAILED DESCRIPTION OF THE INVENTION

Figure 1:
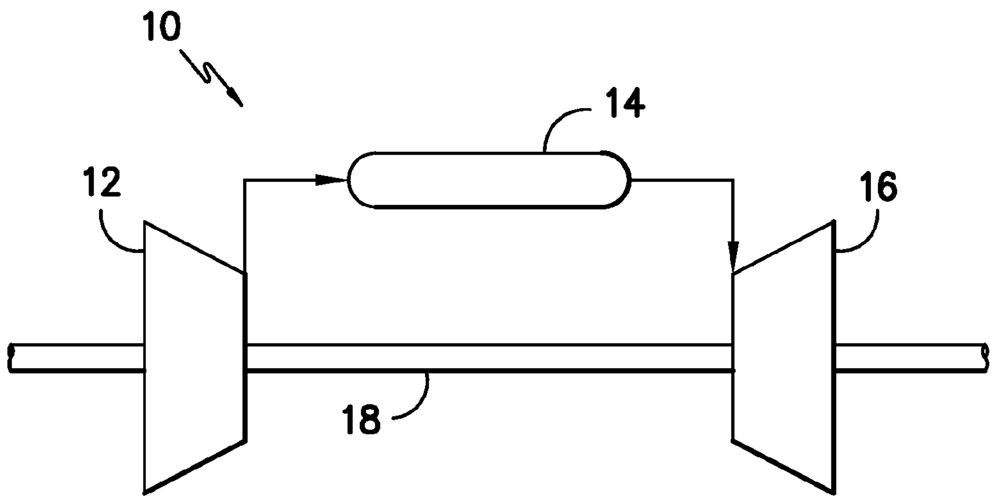
FIG. 1 is a schematic view of a gas turbine system according to one embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 is a schematic diagram of a gas turbine system 10. It should be understood that the turbine system 10 of the present disclosure need not be a gas turbine system 10, but rather may be any suitable turbine system 10, such as a steam turbine system or other suitable system. The gas turbine system 10 may include a compressor section 12, a combustor section 14 which may include a plurality of combustors 15 as discussed below, and a turbine section 16. The compressor section 12 and turbine section 16 may be coupled by a shaft 18. The shaft 18 may be a single shaft or a plurality of shaft segments coupled together to form shaft 18. The shaft 18 may further be coupled to a generator or other suitable energy storage device, or may be connected directly to, for example, an electrical grid. Exhaust gases from the system 10 may be exhausted into the atmosphere, flowed to a steam turbine or other suitable system, or recycled through a heat recovery steam generator.

Figure 2:
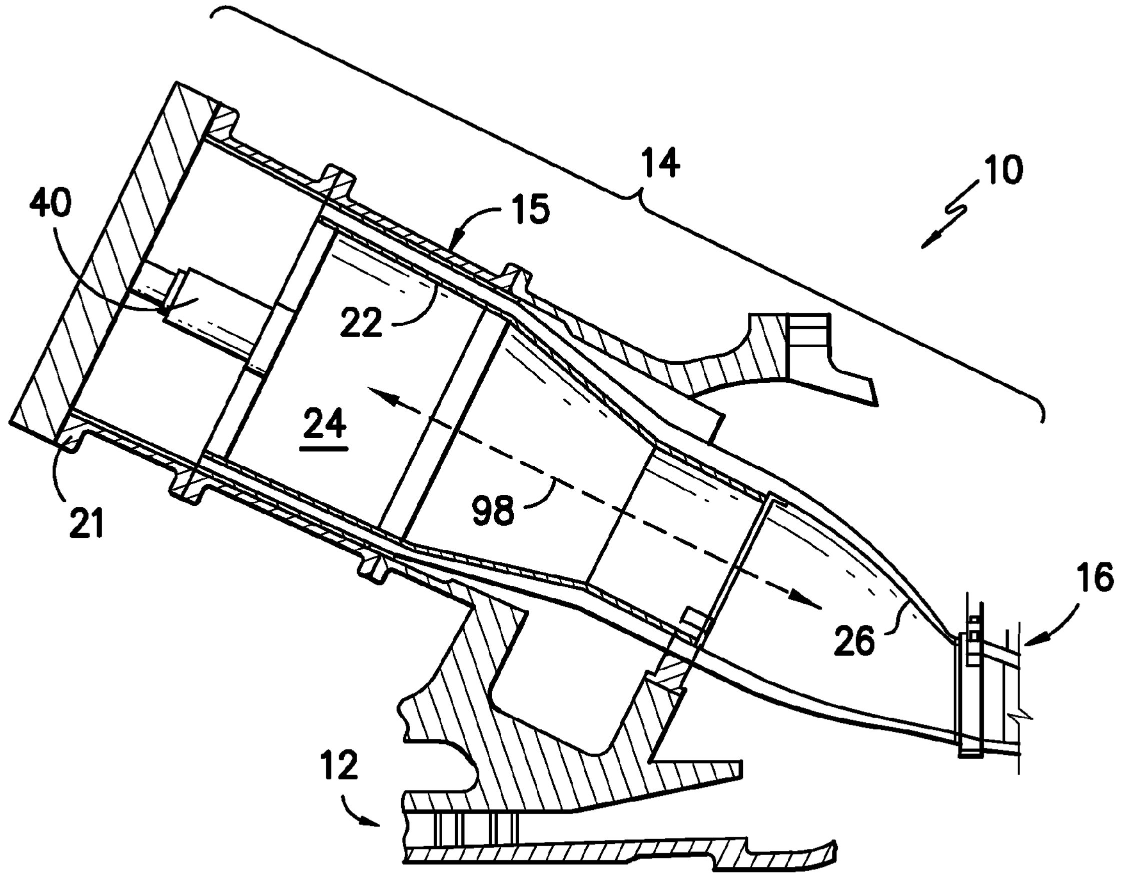
FIG. 2 is a cross-sectional view of several portions of a gas turbine system according to one embodiment of the present disclosure.

Referring to FIG. 2, a simplified drawing of several portions of a gas turbine system 10 is illustrated. The gas turbine system 10 as shown in FIG. 2 comprises a compressor section 12 for pressurizing a working fluid, discussed below, that is flowing through the system 10. Pressurized working fluid discharged from the compressor section 12 flows into a combustor section 14, which may include a plurality of combustors 15 (only one of which is illustrated in FIG. 2) disposed in an annular array about an axis of the system 10. The working fluid entering the combustor section 14 is mixed with fuel, such as natural gas or another suitable liquid or gas, and combusted. Hot gases of combustion flow from each combustor 15 to a turbine section 16 to drive the system 10 and generate power.

A combustor 15 in the gas turbine 10 may include a variety of components for mixing and combusting the working fluid and fuel. For example, the combustor 15 may include a casing 21, such as a compressor discharge casing 21. A variety of sleeves, which may be axially extending annular sleeves, may be at least partially disposed in the casing 21. The sleeves, as shown in FIG. 2, extend axially along a generally longitudinal axis 98, such that the inlet of a sleeve is axially aligned with the outlet. For example, a combustor liner 22 may generally define a combustion zone 24 therein. Combustion of the working fluid, fuel, and optional oxidizer may generally occur in the combustion zone 24. The resulting hot gases of combustion may flow generally axially along the longitudinal axis 98 downstream through the combustion liner 22 into a transition piece 26, and then flow generally axially along the longitudinal axis 98 through the transition piece 26 and into the turbine section 16.

The combustor 15 may further include a fuel nozzle 40 or a plurality of fuel nozzles 40. Fuel may be supplied to the fuel nozzles 40 by one or more manifolds (not shown). As discussed below, the fuel nozzle 40 or fuel nozzles 40 may supply the fuel and, optionally, working fluid to the combustion zone 24 for combustion.

As shown in FIG. 3 through 6, a combustor 15 according to the present disclosure may include one or more transition ducts 50. The transition ducts 50 of the present disclosure may be provided in place of various axially extending sleeves of other combustors. For example, a transition duct 50 may replace the axially extending transition piece 26 and, optionally, the combustor liner 22 of a combustor 15. Thus, the transition duct may extend from the fuel nozzles 40, or from the combustor liner 22. As discussed below, the transition duct 50 may provide various advantages over the axially extending combustor liners 22 and transition pieces 26 for flowing working fluid therethrough and to the turbine section 16.

As shown, the plurality of transition ducts 50 may be disposed in an annular array about a longitudinal axis 90. Further, each transition duct 50 may extend between a fuel nozzle 40 or plurality of fuel nozzles 40 and the turbine section 16. For example, each transition duct 50 may extend from the fuel nozzles 40 to the turbine section 16. Thus, working fluid may flow generally from the fuel nozzles 40 through the transition duct 50 to the turbine section 16. In some embodiments, the transition ducts 50 may advantageously allow for the elimination of the first stage nozzles in the turbine section, which may eliminate any associated drag and pressure drop and increase the efficiency and output of the system 10.

Each transition duct 50 may have an inlet 52, an outlet 54, and a passage 56 therebetween. The inlet 52 and outlet 54 of a transition duct 50 may have generally circular or oval cross-sections, rectangular cross-sections, triangular cross-sections, or any other suitable polygonal cross-sections. Further, it should be understood that the inlet 52 and outlet 54 of a transition duct 50 need not have similarly shaped cross-sections. For example, in one embodiment, the inlet 52 may have a generally circular cross-section, while the outlet 54 may have a generally rectangular cross-section.

Further, the passage 56 may be generally tapered between the inlet 52 and the outlet 54. For example, in an exemplary embodiment, at least a portion of the passage 56 may be generally conically shaped. Additionally or alternatively, however, the passage 56 or any portion thereof may have a generally rectangular cross-section, triangular cross-section, or any other suitable polygonal cross-section. It should be understood that the cross-sectional shape of the passage 56 may change throughout the passage 56 or any portion thereof as the passage 56 tapers from the relatively larger inlet 52 to the relatively smaller outlet 54.

The outlet 54 of each of the plurality of transition ducts 50 may be offset from the inlet 52 of the respective transition duct 50. The term "offset", as used herein, means spaced from along the identified coordinate direction. The outlet 54 of each of the plurality of transition ducts 50 may be longitudinally offset from the inlet 52 of the respective transition duct 50, such as offset along the longitudinal axis 90.

Additionally, in exemplary embodiments, the outlet 54 of each of the plurality of transition ducts 50 may be tangentially offset from the inlet 52 of the respective transition duct 50, such as offset along a tangential axis 92. Because the outlet 54 of each of the plurality of transition ducts 50 is tangentially offset from the inlet 52 of the respective transition duct 50, the transition ducts 50 may advantageously utilize the tangential component of the flow of working fluid through the transition ducts 50 to eliminate the need for first stage nozzles in the turbine section 16, as discussed below.

Further, in exemplary embodiments, the outlet 54 of each of the plurality of transition ducts 50 may be radially offset from the inlet 52 of the respective transition duct 50, such as offset along a radial axis 94. Because the outlet 54 of each of the plurality of transition ducts 50 is radially offset from the inlet 52 of the respective transition duct 50, the transition ducts 50 may advantageously utilize the radial component of the flow of working fluid through the transition ducts 50 to further eliminate the need for first stage nozzles in the turbine section 16, as discussed below.

Figure 3:
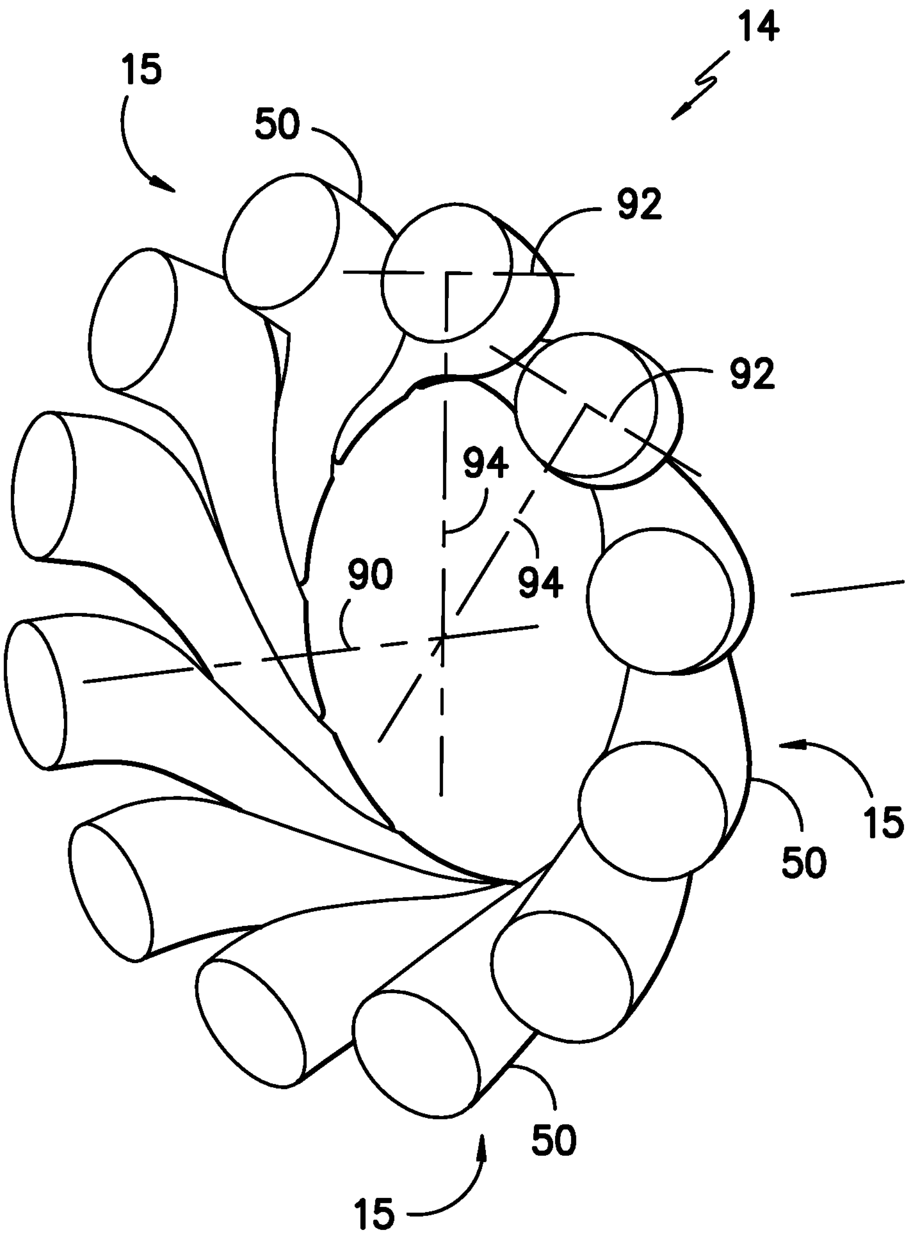
FIG. 3 is a perspective view of an annular array of transition ducts according to one embodiment of the present disclosure.

It should be understood that the tangential axis 92 and the radial axis 94 are defined individually for each transition duct 50 with respect to the circumference defined by the annular array of transition ducts 50, as shown in FIG. 3, and that the axes 92 and 94 vary for each transition duct 50 about the circumference based on the number of transition ducts 50 disposed in an annular array about the longitudinal axis 90.

Figure 7:
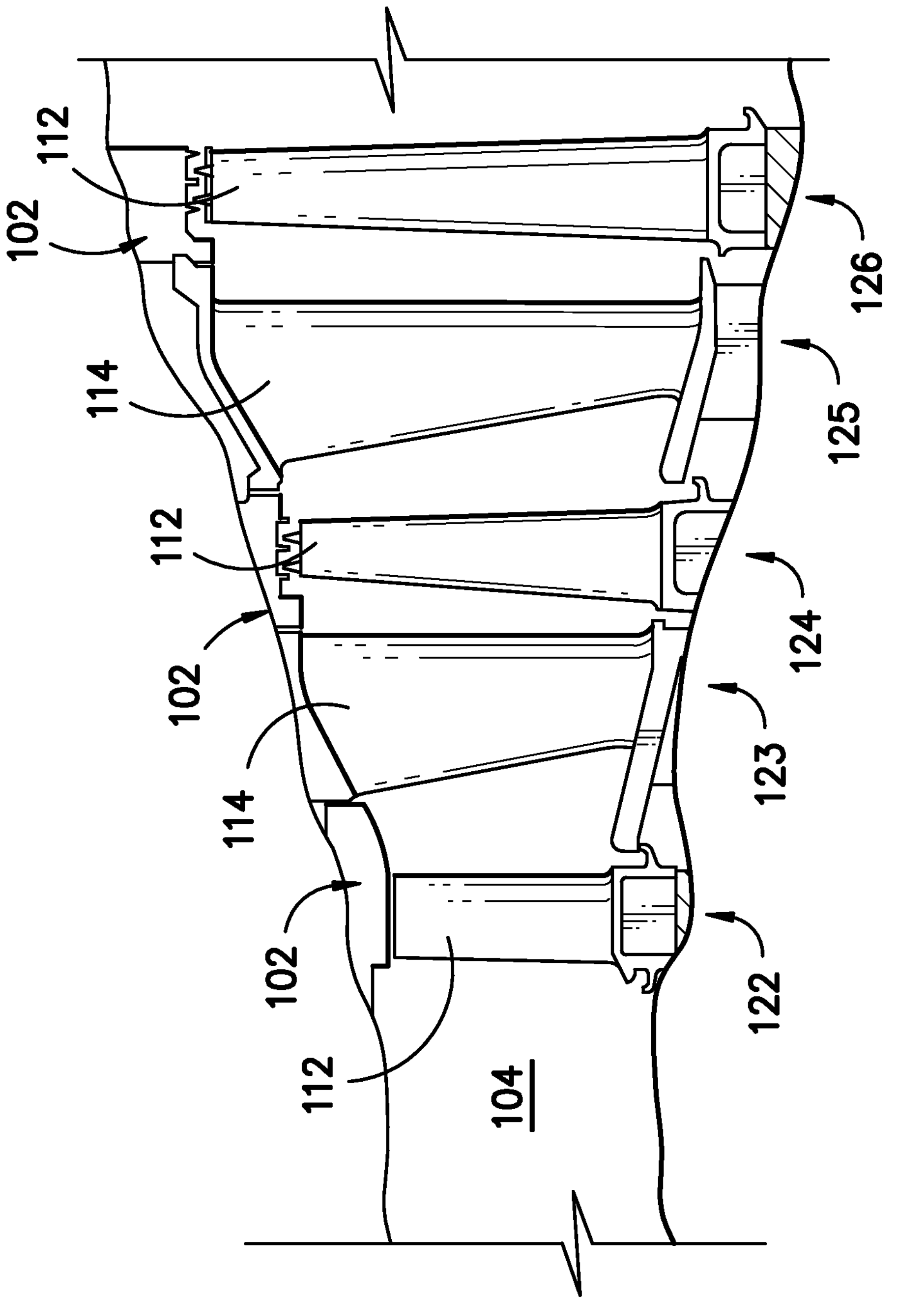
FIG. 7 is a cross-sectional view of a turbine section of a gas turbine system according to one embodiment of the present disclosure.

As discussed, after hot gases of combustion are flowed through the transition duct 50, they may be flowed from the transition duct 50 into the turbine section 16. As shown in FIG. 7, a turbine section 16 according to the present disclosure may include a shroud 102, which may define a hot gas path 104. The shroud 102 may be formed from a plurality of shroud blocks 106. The shroud blocks 106 may be disposed in one or more annular arrays, each of which may define a portion of the hot gas path 104 therein.

The turbine section 16 may further include a plurality of buckets 112 and a plurality of nozzles 114. Each of the plurality of buckets 112 and nozzles 114 may be at least partially disposed in the hot gas path 104. Further, the plurality of buckets 112 and the plurality of nozzles 114 may be disposed in one or more annular arrays, each of which may define a portion of the hot gas path 104.

The turbine section 16 may include a plurality of turbine stages. Each stage may include a plurality of buckets 112 disposed in an annular array and a plurality of nozzles 114 disposed in an annular array. For example, in one embodiment, the turbine section 16 may have three stages, as shown in FIG. 7. For example, a first stage of the turbine section 16 may include a first stage nozzle assembly (not shown) and a first stage buckets assembly 122. The nozzles assembly may include a plurality of nozzles 114 disposed and fixed circumferentially about the shaft 18. The bucket assembly 122 may include a plurality of buckets 112 disposed circumferentially about the shaft 18 and coupled to the shaft 18. In exemplary embodiments wherein the turbine section is coupled to combustor section 14 comprising a plurality of transition ducts 50, however, the first stage nozzle assembly may be eliminated, such that no nozzles are disposed upstream of the first stage bucket assembly 122. Upstream may be defined relative to the flow of hot gases of combustion through the hot gas path 104.

A second stage of the turbine section 16 may include a second stage nozzle assembly 123 and a second stage buckets assembly 124. The nozzles 114 included in the nozzle assembly 123 may be disposed and fixed circumferentially about the shaft 18. The buckets 112 included in the bucket assembly 124 may be disposed circumferentially about the shaft 18 and coupled to the shaft 18. The second stage nozzle assembly 123 is thus positioned between the first stage bucket assembly 122 and second stage bucket assembly 124 along the hot gas path 104. A third stage of the turbine section 16 may include a third stage nozzle assembly 125 and a third stage bucket assembly 126. The nozzles 114 included in the nozzle assembly 125 may be disposed and fixed circumferentially about the shaft 18. The buckets 112 included in the bucket assembly 126 may be disposed circumferentially about the shaft 18 and coupled to the shaft 18. The third stage nozzle assembly 125 is thus positioned between the second stage bucket assembly 124 and third stage bucket assembly 126 along the hot gas path 104.

It should be understood that the turbine section 16 is not limited to three stages, but rather that any number of stages are within the scope and spirit of the present disclosure.

Each transition duct 50 may interface with one or more adjacent transition ducts 50. For example, a transition duct 50 may include one or more contact faces 130, which may be included in the outlet of the transition duct 50. The contact faces 130 may contact associated contact faces 130 of adjacent transition ducts 50, as shown, to provide an interface between the transition ducts 50.

Figure 6:
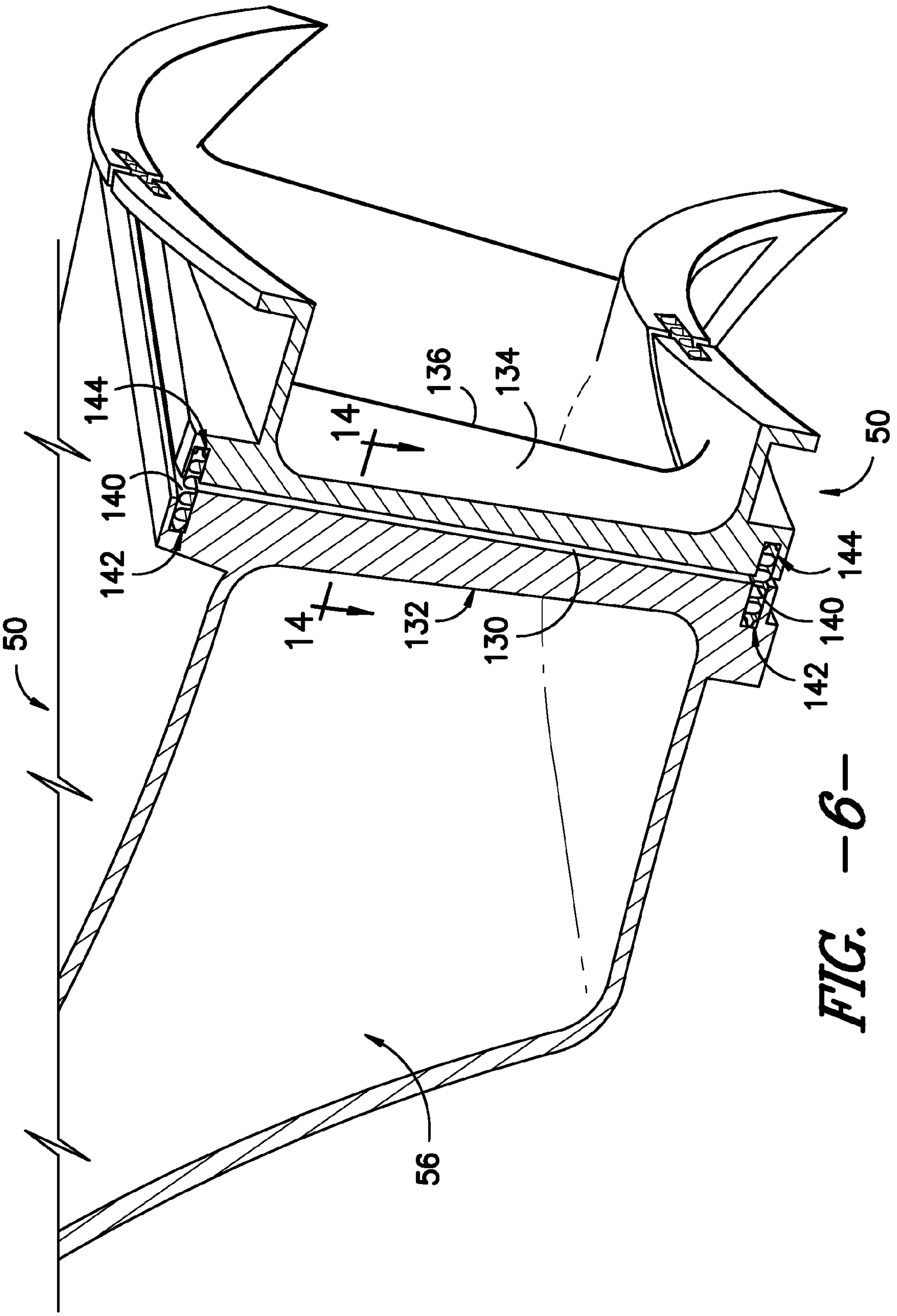
FIG. 6 is a cutaway perspective view of a plurality of transition ducts according to one embodiment of the present disclosure.

Further, the adjacent transition ducts 50 may combine to form various surface of an airfoil. These various surfaces may shift the hot gas flow in the transition ducts 50, and thus eliminate the need for first stage nozzles, as discussed above. For example, as shown in FIG. 6, an inner surface of a passage 56 of a transition duct 50 may define a pressure side 132, while an opposing inner surface of a passage 56 of an adjacent transition duct 50 may define a suction side 134. When the adjacent transition ducts 50, such as the contact faces 130 thereof, interface with each other, the pressure side 132 and suction side 134 may combine to define a trailing edge 136.

As discussed above, the outlet 54 of each of the plurality of transition ducts 50 may be longitudinally, radially, and/or tangentially offset from the inlet 52 of the respective transition duct 50. These various offsets of the transition ducts 50 may cause unexpected movement of the transition ducts 50 due to thermal growth during operation of the system 10. For example, each transition duct 50 may interface with one or more adjacent transition ducts 50. However, thermal growth may cause the outlet 54 to move with respect to the turbine section 16 about or along one or more of the longitudinal axis 90, tangential axis 92, and/or radial axis 94.

To prevent gaps between adjacent transition ducts 50, the present disclosure may further be directed to one or more convolution seals 140. Each convolution seal 140 may be provided at an interface between adjacent transition ducts 50. The present inventors have discovered that convolution seals are particularly advantageous at sealing the interface between adjacent transition ducts 50, because the convolution seals 140 can accommodate the unexpected movement of the outlet 54 along or about the various axis 90, 92, 94, as discussed above.

As shown in FIGS. 4 through 6 and 8 through 14, a transition duct 50 according to the present disclosure includes one or more first interface features 142. The interface features 142 may be included on one or more contact faces 130 of the transition duct 50, and are positioned to interface with adjacent contact faces 130 and interface features, such as second interface features 144, thereof of adjacent transition ducts 50. In one embodiment as shown, for example, two interface features 142 may be included on a contact face 130 extending generally parallel to each other, while a third interface feature

142 may be included on the contact face 130 that extends generally perpendicular to and between the two parallel interface features 142. The associated contact face 130 of an adjacent transition duct 50 may include associated second interface features 144. It should be understood, however, that the present disclosure is not limited to interface features position as shown and described above, and rather that any suitable interface features having any suitable positioning on a contact face 130 is within the scope and spirit of the present disclosure.

Figure 14:
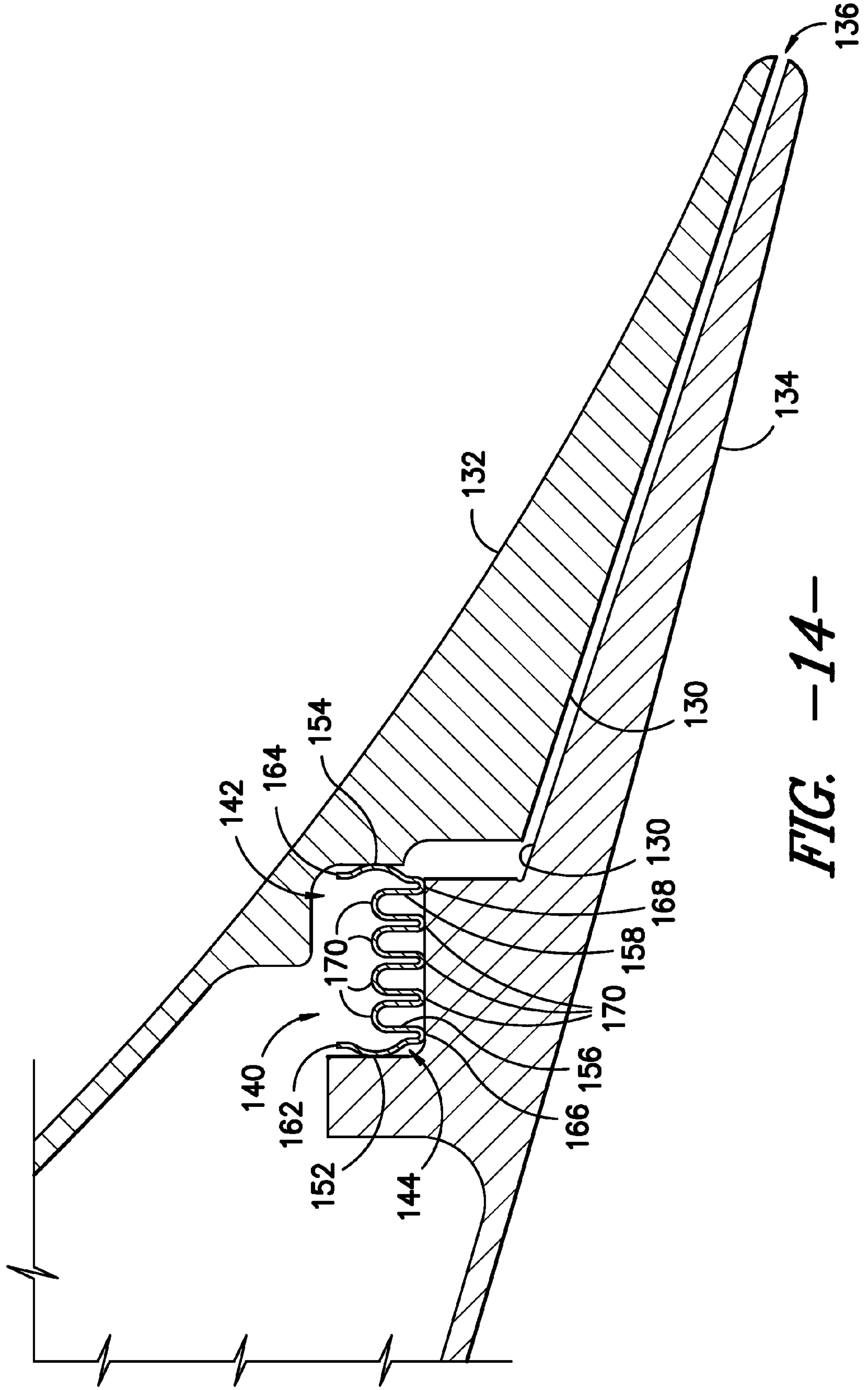
FIG. 14 is a cross-sectional view, along the lines 14-14 of FIG. 6, of an interface between a transition duct and an adjacent transition duct according to another embodiment of the present disclosure.

In some exemplary embodiments, as shown in FIGS. 3 through 6 and 8 through 13, an interface feature, such as a first interface feature 142 and/or a second interface feature 144, is a channel. The channel may be defined in a contact face 130. A convolution seal 140 may, as shown, be at least partially disposed in the channel. The channel may retain the convolution seal during operation of the system 10. In other exemplary embodiments, as shown in FIG. 14, an interface feature, such as a first interface feature 142 and/or a second interface feature 144, is a lip. The lip may be defined in a contact face 130. A convolution seal 140 may, as shown, be at least partially disposed in the lip. The lip may retain the convolution seal during operation of the system 10. In still other embodiments, an interface feature, such as a first interface feature 142 and/or a second interface feature 144, may be a portion of a contact face 130, or any other suitable feature interact with a convolution seal 140 to provide a seal as discussed herein.

As shown, a convolution seal 140 according to the present disclosure may contact a first interface feature 142 of a contact face 130 of a transition duct 50 and an associated second interface feature 144 of a contact face 130 of an adjacent transition duct 50, such as by being disposed at least partially within the first interface feature 142 and associated second interface feature 144. Such contact may allow the first and second features 142, 144 to interface, and may provide a seal between the adjacent contact faces 130, and thus between the adjacent transition ducts 50.

A convolution seal 140 according to the present disclosure has one or more folds or curves, as shown, thus defining various legs that facilitate sealing. The seal 140 may be formed from a metal or metal alloy, or from any other suitable material. The convolutions in the seal 140, as discussed below, may allow the various legs of the seal to flex relative to one another to facilitate sealing. As shown in FIGS. 4 through 6 and 8 through 14, a convolution seal 140 according to the present disclosure may include outer legs 152 and 154. In some embodiments, a convolution seal 140 may further include inner legs 156, 158 between the outer legs 152, 154. The outer legs 152, 154 may define ends 162, 164. In some embodiments, as shown in FIGS. 4 through 6 and 8 through 11, outer leg 152 may be connected to inner leg 156 at intersection 166, and outer leg 164 may be connected to inner leg 158 at intersection 168. Inner legs 156 and 158 may be coupled to each other at intersection 170. The outer legs 152, 154 and inner legs 156, 158 may thus form a generally W-shaped cross-section, as shown. In other embodiments, as shown in FIG. 12, the outer legs 152 and 154 may be connected to each other at intersection 172, with no inner legs therebetween, and may thus form a generally V-shaped cross-section, as shown. In still other embodiments, as shown in FIGS. 13 and 14, outer leg 152 may be connected to inner leg 156 at intersection 166, and outer leg 164 may be connected to inner leg 158 at intersection 168. Additional inner legs 156 and 158 may connect with the inner legs 156, 158 connected to the outer legs 152, 154. The inner legs 156 and 158 may be coupled to each other at intersections 170. The various intersections are convolutions, as shown. It should be understood that zero, one, two, three, four, five, six, seven, eight or more inner legs may be provided between the outer legs of a convolution seal and have any suitable arrangement according to the present disclosure.

As mentioned above, a convolution seal 140 according to the present disclosure may contact a first interface feature 142, and may further contact a second interface feature 144, to provide a seal between adjacent contact faces 130 and thus between adjacent transition ducts 50. In exemplary embodiments, one outer leg 152 may contact one of the first interface feature 142 or second interface feature 144, such as by being disposed therein, and the other outer leg 154 may contact the other of the first interface feature 142 or second interface feature 144, such as by being disposed therein. The inner legs 156, 158 may connect the outer legs 152, 154, or the outer legs 152, 154 may be connected to each other. A convolution seal 140 may thus advantageously provide a seal between the contact faces 130.

Figure 8:
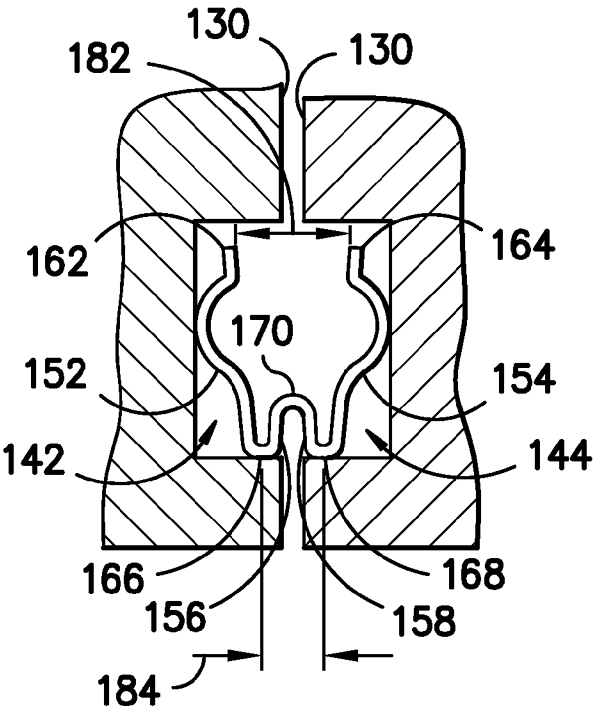
FIG. 8 is a cross-sectional view of an interface between a transition duct and an adjacent transition duct according to one embodiment of the present disclosure.
Figure 9:
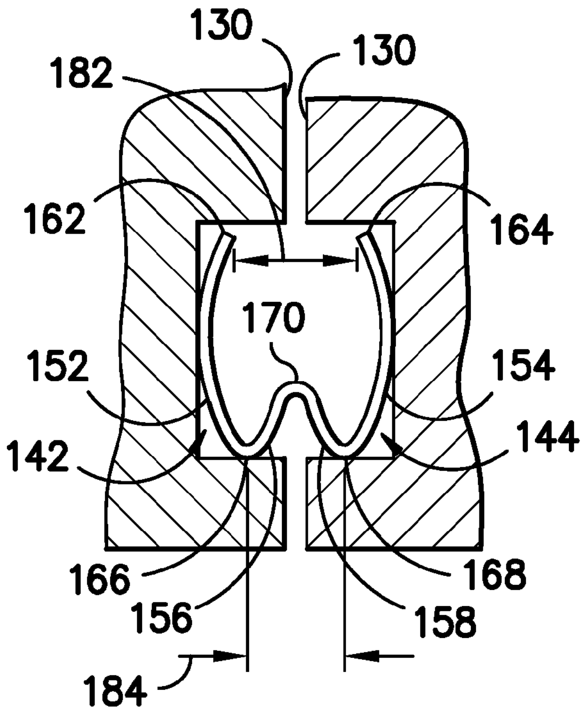
FIG. 9 is a cross-sectional view of an interface between a transition duct and an adjacent transition duct according to another embodiment of the present disclosure.

One or more of the outer legs 152, 154 and/or inner legs 156, 158, or any portion thereof, may be linear or curvilinear. Thus, a cross-sectional profile of the leg 152, 154, 156, 158 or portion thereof may extend linearly or curvilinearly. For example, in one embodiment as shown in FIG. 8, a portion of an outer leg 152, 154 may be curvilinear, while the surrounding portions that include the end 162, 164 and/or intersection 166, 168 is linear. In other embodiments, other portions of an outer leg 152, 154, such as the portions including the end 162, 164 and/or intersection 166, 168, may be curvilinear, while other portions are linear. It should be understood that any portion or portions of an outer leg 152, 154 according to the present disclosure may be linear or curvilinear. In other embodiments, as shown in FIGS. 9 and 14, an entire outer leg 152, 154 may be curvilinear. In still other embodiments, as shown in FIG. 10 through 13, an entire outer leg 152, 154 may be linear.

As further shown in FIG. 8 through 14, the outer legs 152 and 154, such as the cross-sectional profiles thereof, may have various positions relative to one another. For example, in some embodiments, as shown in FIGS. 10 and 14, the legs 152 and 154 may be generally parallel when in an operating condition. An operating condition is a condition wherein the seal 140 is subjected to the temperature or temperature range and pressure or pressure range that it may be subjected to during normal operation of the system 10. For example, in one embodiment, the operating condition may be the condition that the seal 140 is being subjected to inside of the system 10 during operation thereof. In these embodiments, and in further embodiments as shown in FIGS. 10 and 14, a width 182 between the legs 152 and 154 at the ends 162 and 164 may be generally identical to a width 184 between the legs at the intersections 166 and 168. In other embodiments, as shown in FIGS. 8 through 9 and 11 through 13, the first outer leg 152 and/or the second outer leg 154 may have an outward bias in an operating condition. In these embodiments, a width 182 between the legs 152 and 154 at the ends 162 and 164 may be generally greater than a width 184 between the legs at the intersections 166 and 168 or intersection 172 (where the width 184 may be zero), as shown. In still other embodiments, the first outer leg 152 and/or the second outer leg 154 may have an inward bias in an operating condition. In these embodiments, a width 182 between the legs 152 and 154 at the ends 162 and 164 may be generally less than a width 184 between the legs at the intersections 166 and 168.

FIG. 8 thus illustrates a convolution seal 140 according to one embodiment of the present disclosure. In this embodiment, the convolution seal 140 includes two inner legs 156, 158 between outer legs 152, 154. A portion of each outer leg 152, 154 is curvilinear, while the surrounding portions that include ends 162, 164 and intersection 166, 168 are linear. The first outer leg 152 and second outer leg 154 have an outward bias in an operating condition.

Figure 4:
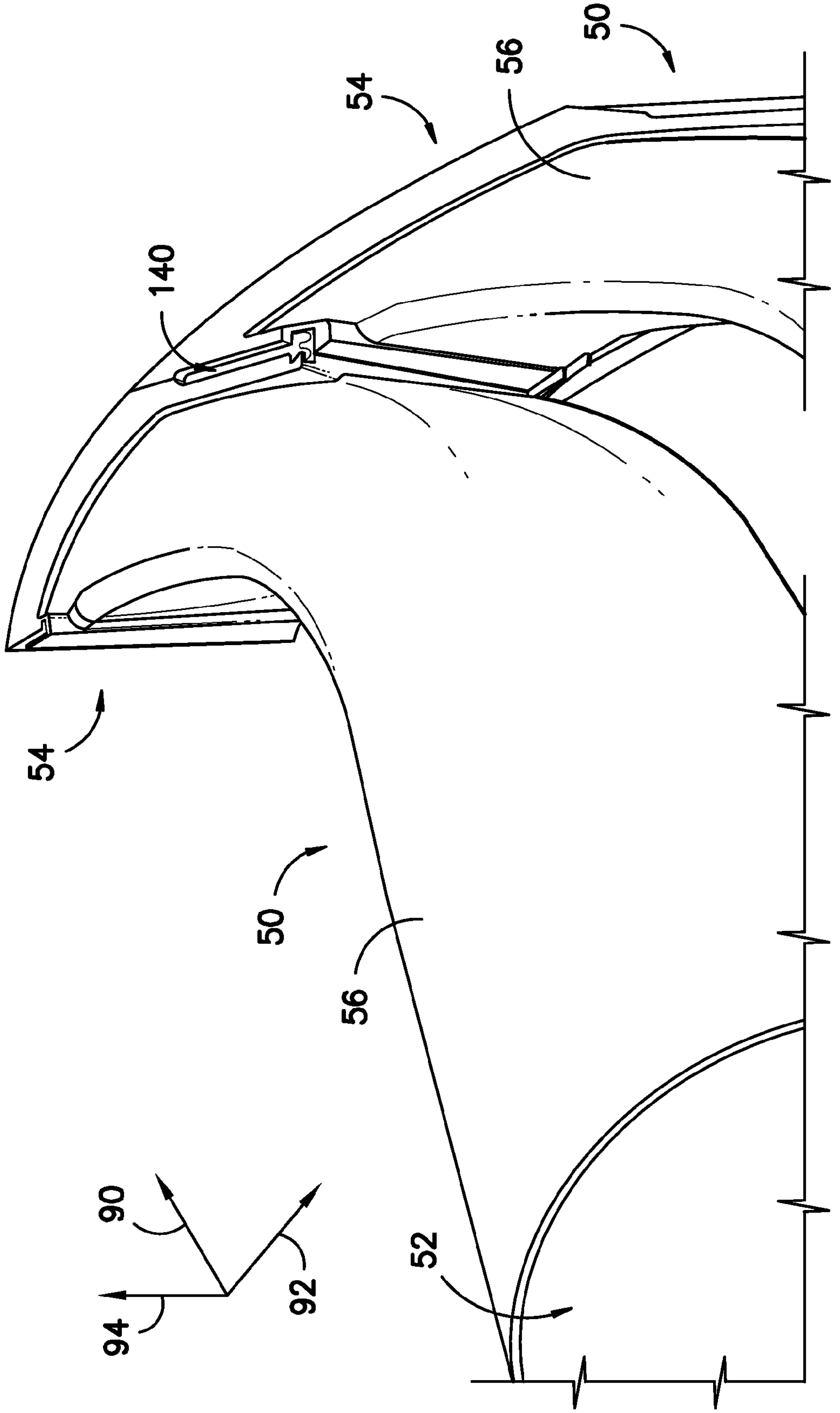
FIG. 4 is a top perspective view of a plurality of transition ducts according to one embodiment of the present disclosure.

FIGS. 4 and 9 illustrate a convolution seal 140 according to another embodiment of the present disclosure. In this embodiment, the convolution seal 140 includes two inner legs 156, 158 between outer legs 152, 154. Each entire outer leg 152, 154 is curvilinear. The first outer leg 152 and second outer leg 154 have an outward bias in an operating condition.

FIG. 10 illustrates a convolution seal 140 according to another embodiment of the present disclosure. In this embodiment, the convolution seal 140 includes two inner legs 156, 158 between outer legs 152, 154. Each entire outer leg 152, 154 is linear. The first outer leg 152 and second outer leg 154 are generally parallel in an operating condition.

FIG. 11 illustrates a convolution seal 140 according to another embodiment of the present disclosure. In this embodiment, the convolution seal 140 includes two inner legs 156, 158 between outer legs 152, 154. Each entire outer leg 152, 154 is linear. The first outer leg 152 and second outer leg 154 have an outward bias in an operating condition.

FIG. 12 illustrates a convolution seal 140 according to another embodiment of the present disclosure. In this embodiment, the convolution seal 140 includes two outer legs 152 and 154 connected to each other at intersection 172, with no inner legs therebetween. Each entire outer leg 152, 154 is linear. The first outer leg 152 and second outer leg 154 have an outward bias in an operating condition.

FIG. 13 illustrates a convolution seal 140 according to another embodiment of the present disclosure. In this embodiment, the convolution seal 140 includes four inner legs 156, 158 between outer legs 152, 154. Each entire outer leg 152, 154 is linear. The first outer leg 152 and second outer leg 154 have an outward bias in an operating condition.

Figure 5:
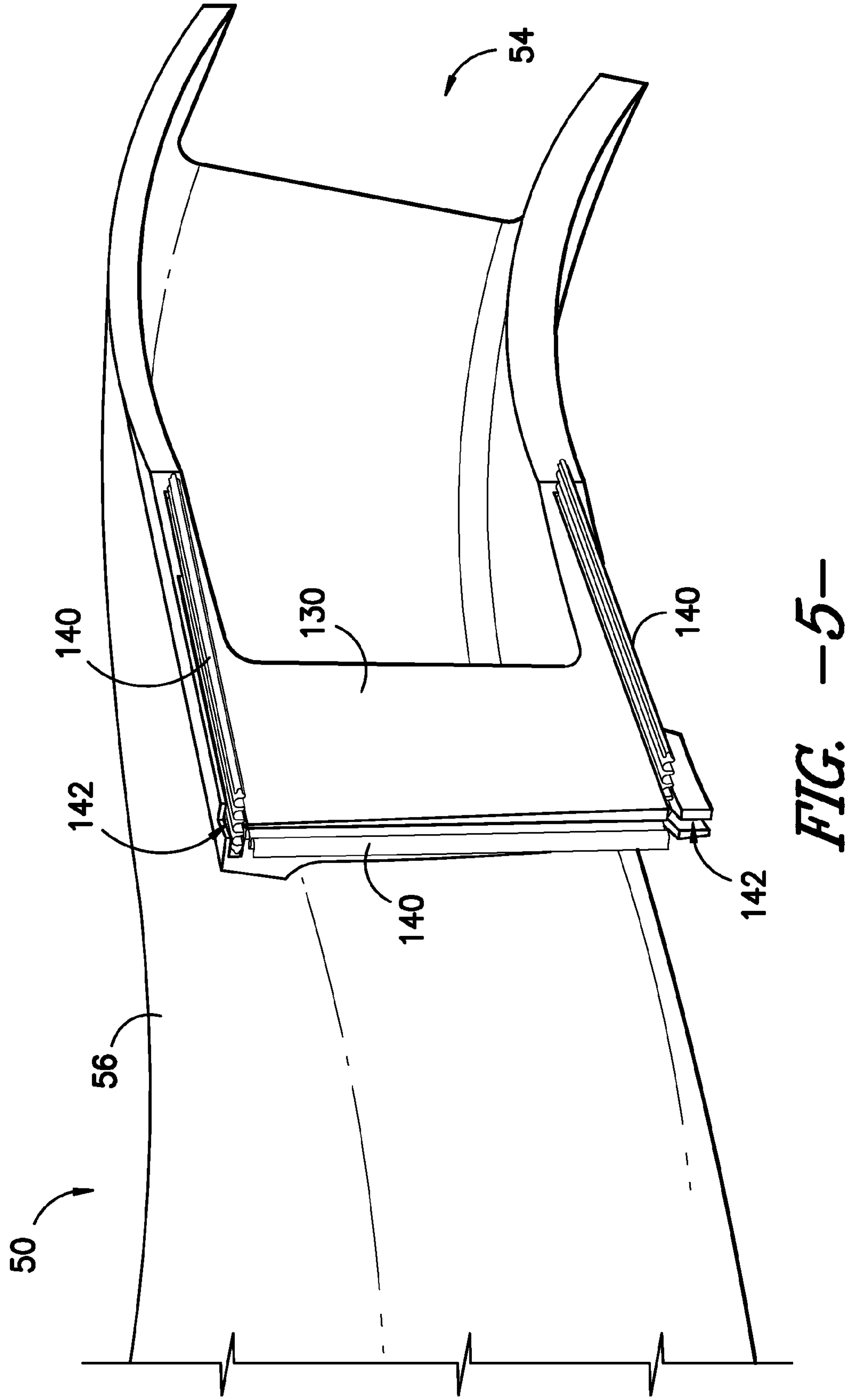
FIG. 5 is a side perspective view of a transition duct according to one embodiment of the present disclosure.

FIGS. 5, 6 and 14 illustrate a convolution seal 140 according to one embodiment of the present disclosure. In this embodiment, the convolution seal 140 includes eight inner legs 156, 158 between outer legs 152, 154. A portion of each outer leg 152, 154 is curvilinear, while the surrounding portions that include ends 162, 164 and intersection 166, 168 are linear. The first outer leg 152 and second outer leg 154 have an outward bias in an operating condition.

A convolution seal 140 of the present disclosure may advantageously allow adjacent transition ducts 50, such as the outlets 54 thereof, to move about or along one or more of the various axis 90, 92, 94 while maintaining a seal therebetween. This may advantageously accommodate the thermal growth of the transition ducts 50, which may be offset as discussed above, while allowing the transition duct 50 to remain sufficiently sealed together. This is particularly advantageous due to the unique formation of airfoil surfaces between adjacent transition ducts 50. In exemplary embodiments, for example, the convolution seal 140 may allow movement of a transition duct 50, such as of the outlet 54 of the transition duct 50, about or along one, two, or three of the longitudinal axis 90, the tangential axis 92 and the radial axis 94. In exemplary embodiments, the convolution seal 140 allows movement about or along all three axes. Thus, convolution seals 140 advantageously provide a seal that accommodates the unexpected movement of the transition ducts 50 of the present disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A turbine system, comprising:

a transition duct comprising an inlet, an outlet, and a passage extending between the inlet and the outlet and defining a longitudinal axis, a radial axis, and a tangential axis, the outlet of the transition duct offset from the inlet along the longitudinal axis and the tangential axis, the transition duct further comprising an interface feature for interfacing with an adjacent transition duct, the interface feature comprising a channel, the channel comprising a first wall, a second wall opposing the first wall, and a third wall joining the first wall and the second wall; and a convolution seal contacting the interface feature and at least partially disposed in the channel to provide a seal between the interface feature and the adjacent transition duct, the convolution seal comprising a plurality of legs, the plurality of legs comprising a first outer leg and a second outer leg, wherein at least one of an intersection of the first outer leg and another of the plurality of legs or an intersection of the second outer leg and another of the plurality of legs is at a non-90 degree angle and is entirely within the channel and contacts the first wall.

2. The turbine system of claim 1, wherein at least a portion of one of the first outer leg and the second outer leg is curvilinear.

3. The turbine system of claim 1, wherein at least a portion of one of the first outer kg and the second outer leg is linear.

4. The turbine system of claim 1, wherein the first outer leg and second outer leg are generally parallel when in an operating condition.

5. The turbine system of claim 1, wherein the first outer leg and second outer leg have an outward bias in an operating condition.

6. The turbine system of claim 1, further comprising a plurality of convolution seals.

7. The turbine system of claim 1, further comprising a plurality of interface features.

8. The turbine system of claim 1, wherein the outlet of the transition duct is further offset from the inlet along the radial axis.

9. The turbine system of claim 1, wherein the interface feature is a first interface feature, and wherein the adjacent transition duct comprises a second interface feature for interfacing with the first interface feature, the convolution seal contacting the second interface feature to provide a seal between the first and second interface features.

10. The turbine system of claim 1, further comprising a turbine section in communication with the transition duct and the adjacent transition duct, the turbine section comprising a first stage bucket assembly.

11. A turbine system, comprising:

a plurality of transition ducts disposed in a generally annular array, each of the plurality of transition ducts comprising an inlet, an outlet, and a passage extending between the inlet and the outlet and defining a longitudinal axis, a radial axis, and a tangential axis, the outlet of the transition duct offset from the inlet along the longitudinal axis and the tangential axis, each of the plurality of transition ducts further comprising a first interface feature and a second interface feature, each of the first interface feature and the second interface feature comprising a channel, the channel comprising a first wall, a second wall opposing the first wall, and a third wall joining the first wall and the second wall;

a plurality of convolution seals, each of the plurality of convolution seals contacting and providing a seal between a first interface feature of one of the plurality of transition ducts and a second interface feature of an adjacent one of the plurality of transition ducts, at least one of the plurality of convolution seals partially disposed in the channel of a first interface feature and partially disposed in the channel of an adjacent second interface feature, the at least one of the plurality of convolution seals comprising a plurality of legs, the plurality of legs comprising a first outer leg and a second outer leg, wherein an intersection of the first outer leg and another of the plurality of legs of the at least one of the plurality of convolution seals is at a non-90 degree angle and is entirely within the channel and contacts the first wall of the first interface feature and an intersection of the second outer leg and another of the plurality of legs of the at least one of the plurality of convolution seals is at a non-90 degree angle and is entirely within the channel and contacts the first wall of the adjacent second interface feature.

12. The turbine system of claim 11, wherein at least a portion of one of the first outer leg and the second outer leg is curvilinear.

13. The turbine system of claim 11, wherein at least a portion of one of the first outer leg and the second outer leg is linear.

14. The turbine system of claim 11, wherein the first outer leg and second outer leg are generally parallel when in an operating condition.

15. The turbine system of claim 11, wherein the first outer leg and second outer leg have an outward bias in an operating condition.

16. The turbine system of claim 11, further comprising a plurality of convolution seals.

17. The turbine system of claim 11, further comprising a plurality of first interface features and a plurality of second interface features.

* * * * *